United States Patent [19]
Elliott et al.

[11] Patent Number: 5,228,614
[45] Date of Patent: Jul. 20, 1993

[54] SOLDER NOZZLE WITH GAS KNIFE JET

[75] Inventors: Donald A. Elliott, Brossard, Canada; Michael T. Mittag, New Haven, Vt.; Vivian G. Power, St. Lambert, Canada

[73] Assignee: Electrovert Ltd., LaPrairie, Canada

[21] Appl. No.: 549,603

[22] Filed: Jul. 9, 1990

[51] Int. Cl.[5] .......................... B23K 1/00; B23K 3/00
[52] U.S. Cl. .......................... 228/37; 228/219
[58] Field of Search .............. 228/37, 219, 262, 180.1, 228/56.2

[56] References Cited

U.S. PATENT DOCUMENTS

| | | | |
|---|---|---|---|
| 3,500,536 | 3/1970 | Goldschmid | 29/623 |
| 3,705,457 | 12/1972 | Tardoskegyi | 29/494 |
| 3,765,591 | 10/1973 | Cook | 228/36 |
| 3,865,298 | 2/1975 | Allen et al. | 228/20 |
| 3,921,888 | 11/1975 | Elliott et al. | 228/180 |
| 4,083,323 | 4/1978 | Rote | 118/63 |
| 4,401,253 | 8/1983 | O'Rourke | 228/125 |
| 4,410,126 | 10/1983 | O'Rourke | 228/180 R |
| 4,465,014 | 8/1984 | Bajka | 228/37 |
| 4,664,308 | 5/1987 | Boynton | 228/37 |
| 4,684,056 | 8/1987 | Deambrosio | 228/180.1 |
| 5,044,542 | 9/1991 | Deambrosio | 228/37 |

FOREIGN PATENT DOCUMENTS 0332740 10/1988 European Pat. Off. .
54-3215 2/1979 Japan .
54-2243 9/1979 Japan .

OTHER PUBLICATIONS

EXXAIR Knife—Published by EXXAIR Corp.—date unknown.
Atmosphere Control in Continuous Furnaces for Electronic Applications—Nowotarski & Schmidt, ISHM Conference, Anahein, Calif., Published Nov. 11, 1985.

Primary Examiner—Richard K. Seidel
Assistant Examiner—James Miner
Attorney, Agent, or Firm—Darby & Darby

[57] ABSTRACT

A solder nozzle to produce a smooth turbulent free solder wave has at least one air jet associated therewith to remove solder icicles and bridges that can form on the under surface of circuit boards and other elements. The circuit boards move in an upward inclined path in the direction of travel and after passing through the solder wave an air knife projects a non-oxidizing gas with sufficient force to remove excess solder. The soldering can occur in a non-oxidizing gas enclosure such as an inert gas, or a reducing gas, and vibrating the solder wave below ultrasonic frequencies can assist in the soldering.

7 Claims, 6 Drawing Sheets

SOLDER NOZZLE WITH GAS KNIFE JET

The present invention relates to wave soldering elements such as printed wiring boards and the like. More specifically the present invention relates to wave soldering wherein a circuit board or other element is passed through a solder wave and the underside of the board is treated to avoid bridges and icicles of solder remaining on the undersurface of the element.

When elements such as printed circuit boards are soldered they invariably have pins to form connections for surface mounted devices, such as resistors, capacitors, integrated circuits and the like extending through the board and these must be soldered to form an integrated circuit. A concern has always existed in the soldering process that if care is not taken bridges or icicles of solder remain on the bottom surface of the circuit board and cause shorts. Various processes and devices are provided to avoid these icicles and bridges. In one case, reference is made to U.S. Pat. No. 3,921,888 Elliott et al, which discloses the wave soldering of printed circuits wherein the pins projecting through a circuit board move on a conveyor at approximately the same speed as a smooth stream of solder from the solder wave so that the relative movement between the pins and the solder is substantially a vertical movement to avoid side icicles of solder forming.

In the types of circuit boards soldered in the past, the pins were after as much as 0.10 of an inch apart. In todays technologies some components have 100 or more leads per inch and thus the problem of excess solder on the joints, leads, pins and the like is even more important. Fine pitch technology has reopened the need for ensuring bridges and icicles are not formed on the undersurface of circuit boards.

Furthermore in todays soldering, the soldering can occur in a non-oxidizing gas environment which may be an inert gas such as nitrogen, a reducing gas or other types of special environments. In certain cases when soldering occurs in nitrogen, it has been found that solder bridges and icicles occur more frequently.

Soldering of circuit boards and the like may occur in a reducing gas or inert gas atmosphere which in some cases avoids the necessity of applying a flux to the element prior to soldering. Tardoskegyi in U.S. Pat. No. 3,705,457 discloses a ballistic type solder wave being projected upwards in one direction opposite to the movement of a circuit board or element, and a second nozzle positioned beside the solder nozzle acts as a jet or slot for discharging inert gas over the surface of the projecting solder wave. This type of solder wave can cause bridges or icicles of solder. The inert gas is for the purpose of inhibiting oxidation of the solder on the underside of the boards.

By utilizing a solder wave which is not a ballistic or jet like type of solder wave, but one that forms a crest above a solder nozzle thus providing a smooth turbulent free solder wave which produces less dross that the ballistic type. The flow of solder through the nozzle is greater than a ballistic type solder wave, the nozzle has more space between the nozzle walls and the speed or velocity of the upward flowing solder is reduced. This wider type of nozzle permits introduction of a vane for vibrating the solder wave such as that shown by Deambrosio in U.S. Pat. No. 4,684,056. Furthermore, in some instances the solder from the wave overflows only on the entry wall of the nozzle. In other instances the solder overflows over the entry wall and the exit wall of the nozzle. Some solder may be retained in a tray attached to the exit wall of the nozzle with a weir to allow solder to spill over or prevent solder spilling over to suit the required soldering effect. The smooth turbulent free solder wave is quite different to the ballistic type solder wave disclosed by Tardoskegyi.

It has now been found that by the application of at least one gas jet positioned after a smooth turbulent free solder wave, a non-oxidizing gas can be projected onto the underside of the circuit boards, ensuring it is not directed at the surface of the solder. The gas flow is at a sufficient rate to remove icicles and particularly solder bridges from the undersurface of the board or element.

The use of the gas jet injecting non-oxidizing gas to impinge on the undersurface of the element can occur in a normal air environment, or in a non-oxidizing gas environment such as an inert, reducing gas or other special atmosphere. The jet can also be utilized with vibrating the solder wave and with many different types of plateau type contour solder waves including those similar to that disclosed by Elliott et al in U.S. Pat. No. 3,921,888.

The present invention provides a method of wave soldering an element comprising the steps of: forming an upward flowing solder wave between two walls of a nozzle, the walls spaced a sufficient distance apart to provide a smooth turbulent free solder wave; moving the element in a predetermined path inclined upwards in the direction of travel, through the solder wave so that the solder wave contacts at least an undersurface of the element, from an entry side to an exit side of the solder wave, and projecting at least one jet of non-oxidizing gas to impinge on the undersurface of the element after it exits from the solder wave at a sufficient flow rate to remove solder bridges and icicles from the undersurface of the element.

There is also provided an apparatus for soldering an element comprising a solder wave nozzle having an inlet wall and an exit wall, the walls spaced apart a sufficient distance to provide a smooth turbulent free solder wave from the nozzle; pump means to pump solder from a solder reservoir upwards through the nozzle to form the solder wave; conveyor means to convey the element in a predetermined path inclined upwards in the direction of travel, so the solder wave contacts at least an undersurface of the element from an entry side to an exit side of the solder wave; at least one gas jet positioned to impinge non-oxidizing gas on the undersurface of the element after the element exits from the solder wave, and non-oxidizing gas supply means for supplying gas to the jet at a sufficient flow rate to remove solder bridges and icicles from the undersurface of the element.

In drawings which illustrate embodiments of the invention.

Figure 1:
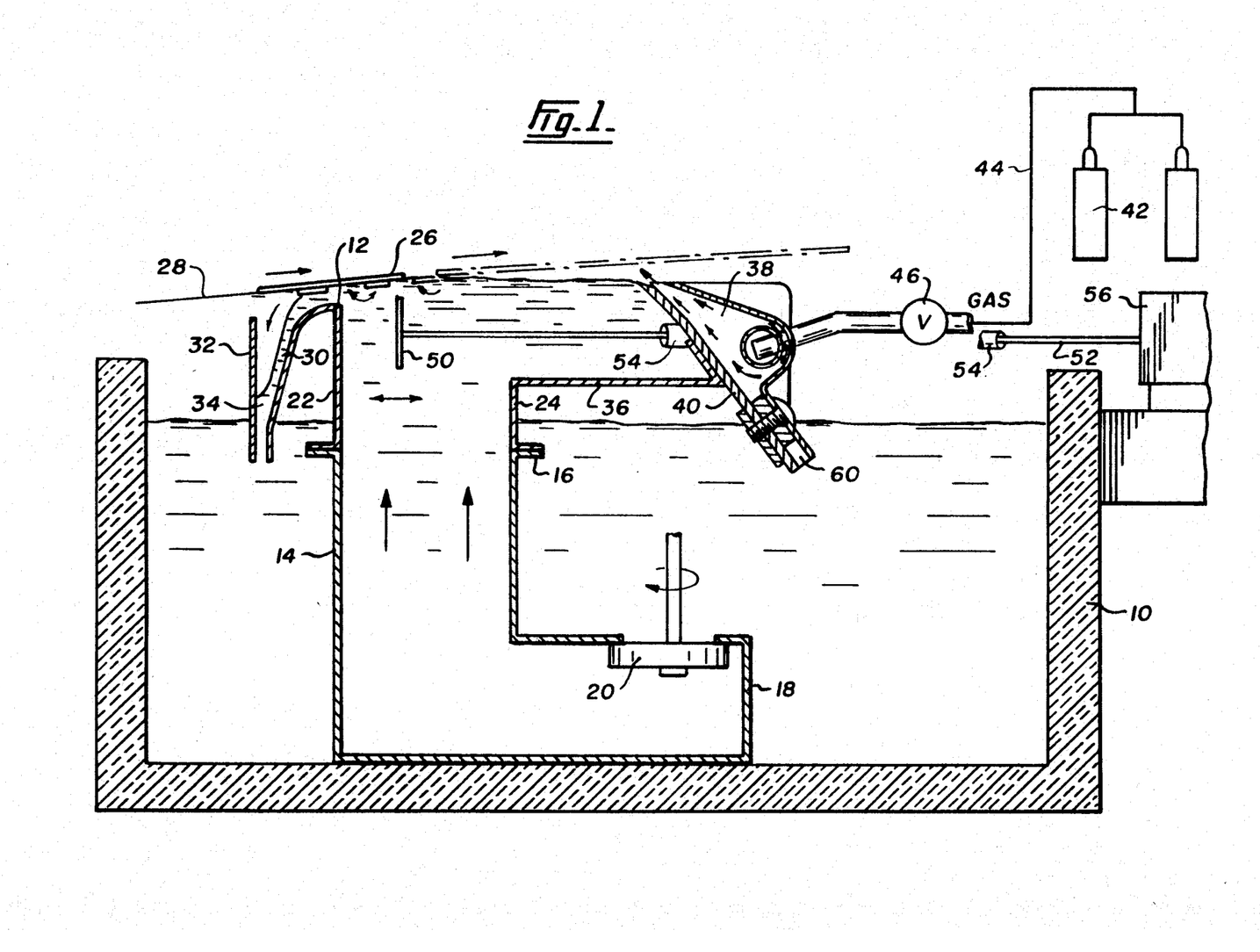
FIG. 1 is a sectional side elevation showing one embodiment of a solder wave nozzle with a gas knife jet integral therewith.

A solder reservoir 10 shown in FIG. 1 is insulated and has therein a solder wave nozzle 12 joined to a chimney 14 at flanges 16. The chimney 14 extends up from an enclosure 18 within the reservoir 10 and has a pump 20 to pump solder up through the chimney 14 to produce a solder wave above the nozzle 12.

The nozzle 12 has an inlet wall 22 and an exit wall 24. Elements 26 which are to be soldered are moved in an upward sloping conveyor path 28 in a direction inclined upwards in the direction of travel. The inlet wall 22 of the nozzle 12 has a front guide 30 providing a downward sloping path for overflowing solder from of the solder wave and an adjustable guide 32 spaced from the front guide 30 which may be moved backwards and forwards to vary the size of the passage 34 of solder returning to the solder reservoir 10 to ensure that the flow of solder is smooth and not turbulent.

A substantially flat tray 36 is provided extending from the exit wall 24 of the nozzle 12, and formed integral therewith is a gas knife jet 38 positioned to project inert gas in a direction counter to the direction of movement of the conveyor 28. Whereas the gas knife jet 38 is shown directing gas in one direction, the angle can be varied to suit the requirements of the solder nozzle and elements to be soldered. The gas knife jet 38 has a front plate 40 which retains solder in the tray 36 extending from the exit wall 24 of the nozzle 30. Should some solder occasionally overflow the front plate 40, either accidently or intentionally on an intermittent basis, the solder flows through the knife jet 38 back into the solder reservoir 10. A non-oxidizing gas supply 42, illustrated as being two gas containers, supplies gas through a gas line 44 and valve 46 to the gas knife jet 38. The valve 46 permits the rate of flow of gas supplied to the gas knife jet 30 to be varied so that it is sufficient to remove icicles, bridges and the like that form or are remaining on the undersurface of the elements 26.

A vibrating vane 50 is attached to a stem 52 and passes through a tube 54 to a vibrator 56. The vibrating mechanism is similar to that disclosed in U.S. Pat. No. 4,684,056 to Deambrosio and the vibrator oscillates the vane 50 in the range of about 20 to 400 Hz during the passage of the element 26 through the solder wave.

In one embodiment the solder wave is adapted to have a portion of the solder flowing from the exit wall 24 of the nozzle 12 and particularly the front plate or weir 40 forming part of the gas knife jet 38. Solder flows downward through the gas knife jet, either purposely or accidently generally on an intermittent basis through exit passage 60 which is below the surface of solder in the reservoir 10. Thus gas entering the gas knife jet 38 through the gas line 44 does not flow downwards into the reservoir 10 but flows upwards through the jet to impinge on the undersurface of the elements 26.

Figure 2:
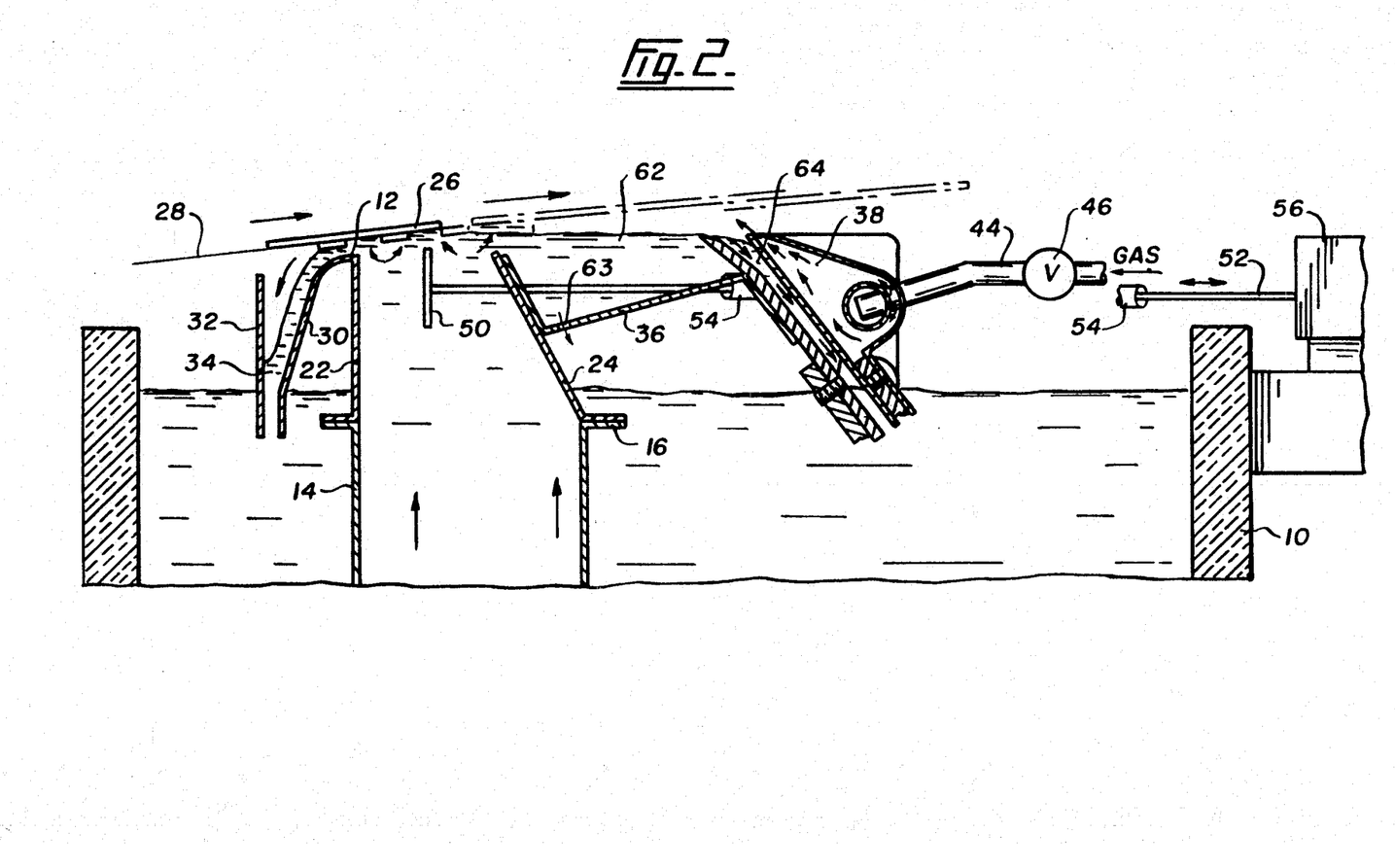
FIG. 2 is a sectional side elevation showing another embodiment of a solder wave nozzle with a gas knife jet incorporated therein.

A different arrangement of nozzle is illustrated in FIG. 2 which is similar to that shown by Elliott et al in U.S. Pat. No. 3,921,888.

The nozzle permits a greater volumetric portion of the solder wave to flow downwards through passage 34 from the entry wall 22 in a smooth flow. The exit wall 24 is sloped inwards from the flange 16 of the chimney 14 and has a substantially rectangular tray 36 when viewed from above, attached to the exit wall 24 with an adjustable weir plate 40 at the edge of the tray 36. The shape of the tray 36 togeter with the weir plate 40 reduces feedback of flow disturbances on the solder wave, and guides the remaining volumetric portion of the solder wave in a smooth horizontal or downward sloping stream 62 in the tray 36 in substantially the same direction and at approximately the same speed as the element 26 moving on the conveyor path 28. The tray 36 has a drain hole 63 for draining solder from the tray 36 and ensuring solder in the tray does not become stagnant and solid. The solder in the tray 36 is always circulating and thus remains heated at all times. As the undersurface of the element 26 raises up out of the solder stream 62, there is substantially no horizontal movement between the element 26 and the solder so icicles or bridges across wires, pins, or contacts do not form.

The weir plate 40 is sloped backwards, and solder flowing over the weir flows into a passage 64 between the weir plate 40 and the gas knife jet 38. The passage 64 is sloped so a smooth flow of solder occurs back into the reservoir 10. The exit of the channel 64 is located below the surface of the solder reservoir so no turbulence occurs when the solder flows back into the reservoir.

Figure 3:
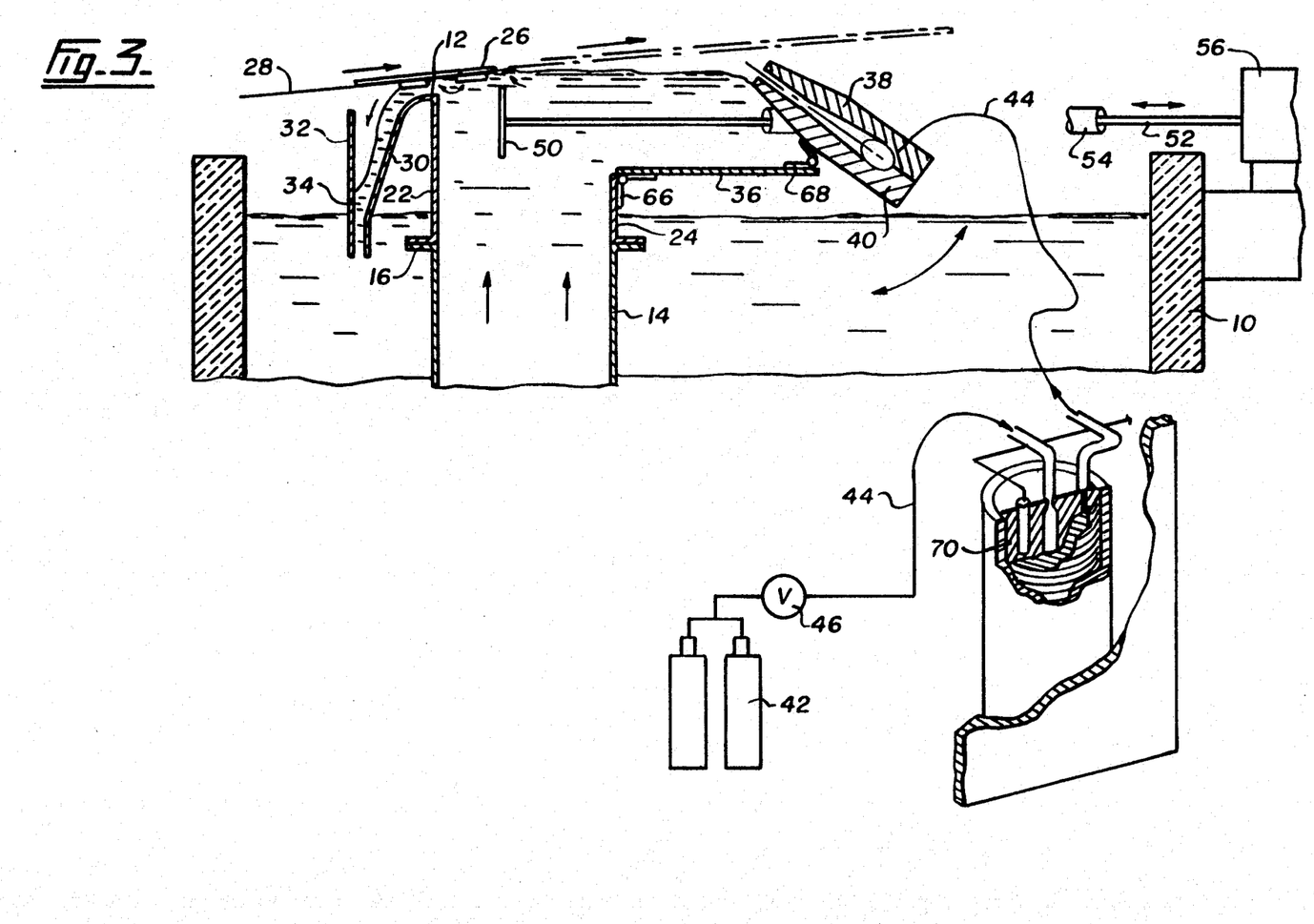
FIG. 3 is a sectional side elevation showing a further embodiment of a solder wave nozzle with a gas knife jet.

FIG. 3 illustrates a solder nozzle similar to that shown in FIG. 1, however the tray 36 has a hinge 66 connecting the tray to the exit wall 24 of the nozzle 12, thus the angle of the tray can be varied as desired. The gas knife jet 38 is shown with the bottom plate 40 forming the weir and has a hinge 68 between the weir 40 which is the bottom plate of the gas knife jet 38 and the tray 36. Thus, the angle that the gas knife jet 30 impinges on the undersurface of the elements 26 can be varied by pivoting the jet 30 about the hinge 68.

A heater 70 for non-oxidizing gas is illustrated in FIG. 3, wherein gas from the gas supply 42 is heated prior to entry into the gas knife jet 38. The gas is at a temperature that is sufficient to prevent the solder cooling and hardening on the undersurface of the elements. The gas has to ensure that excess solder is blown off the elements.

As can be seen, the gas knife jet 38 is directed at the underside of the element 26 but is not directed at the solder wave or the solder wave crest. The purpose of the gas knife jet is to remove icicles or bridges that occur on the undersurface of the element 26. In one embodiment the non-oxidizing gas is an inert gas such as nitrogen. This gas assists in preventing dross formation on the surface of the solder. A reducing gas such as hydrogen may be included or other mixture of gases that are non-oxidizing and are compatible with the solder environment. The flow of gas is sufficient to remove bridges and icicles that form on the undersurface of the elements 26.

Figure 4:
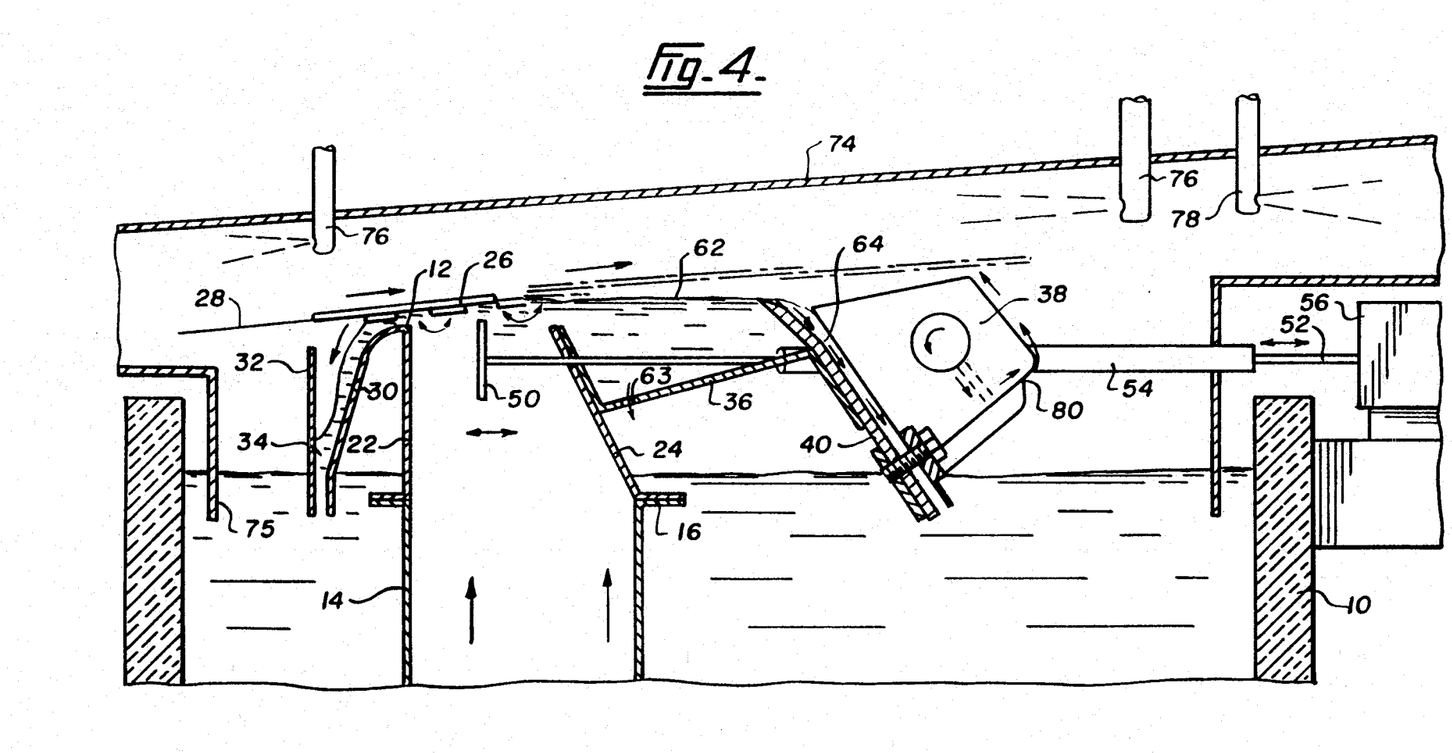
FIG. 4 is a sectional side elevation showing of a still further embodiment of a solder wave nozzle with a different type of gas knife jet incorporated within a gas tight enclosure.

FIG. 4 illustrates an embodiment wherein an enclosure 74 is provided over the conveyor 28 thus ensuring that non-oxidizing gas atmosphere, such as reducing gas, inert gas or other desired mixtures of gases may be maintained within the enclosure 74 during soldering. By the use of certain non-oxidizing gases the necessity of fluxing may be reduced or is avoided. The enclosure 74 has skirts 75 which extend down at all sides and corners into the solder in the solder reservoir 10 thus ensuring a gas seal within the enclosure 74.

The conveyor 28 carrying elements 26 has an entry and an exit into the enclosure. Gas curtains, diffusers, doors, air jets or other suitable devices, are supplied to maintain the gas environment within the enclosure. If gas curtains are used they may be of the type shown in U.S. patent application Ser. No. 448,008. FIG. 4 illustrates inlet biasing jets 76 wherein inert gas, preferably nitrogen, is passed through jets, or diffuser tubes to counter the chimney effect of gas flowing upwards through the enclosure 74 from the inlet to the exit. The chimney effect may occur particularly when the non-oxidizing gas is lighter than air. An exit biasing jet 78 is also illustrated to counter the inlet biasing jets 76. inside the enclosure 74 pointing to the entrance and the exit. The arrangement of biasing jets is disclosed in a paper published Nov. 11, 1985 at an ISHM conference at Anaheim, Ca. by Mark S. Nowotarski and Jerome J. Schmidt entitled "Atmosphere Control in Continuous Furnaces for Electronic Applications". The purpose of the jets is to prevent intrusion of air through the entry and exit of the enclosure. The environment in the enclosure 74 may be a mixture of non-oxidizing gases or a special gas atmosphere or atmospheres. Inert gas, such as nitrogen or reducing gas, which can include hydrogen, may also be present depending on the soldering requirements.

The gas knife 38 illustrated in FIG. 4 has a gas outlet 80 at the side and is arranged to permit gas to flow upwards over the gas knife 38 to impinge on the underside of the circuit boards or elements 26. This type of gas knife 38 is preferably used within enclosure 74 which may be of the shroud or tunnel type. The gas knife jet illustrated in FIG. 4 may be of the type sold under the trade mark EXXAIR-KNIFE which utilizes a small amount of gas and pulls into the knife inert gas from the surrounding atmosphere to produce a high volume high velocity gas flow.

Figure 5:
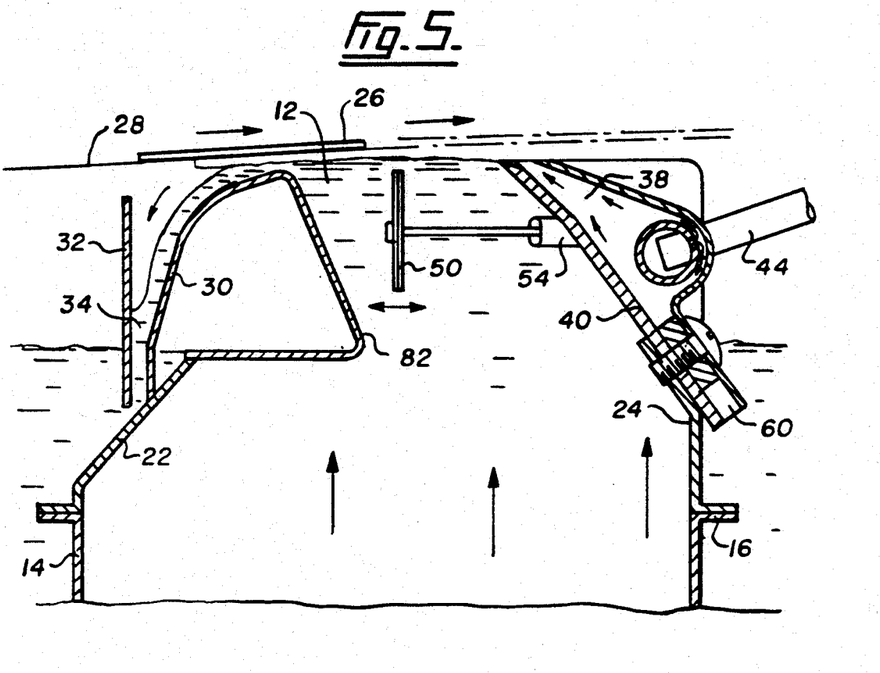
FIGS. 5 and 6 are sectional views of two more embodiments of a solder wave nozzles with gas jets.
Figure 6:
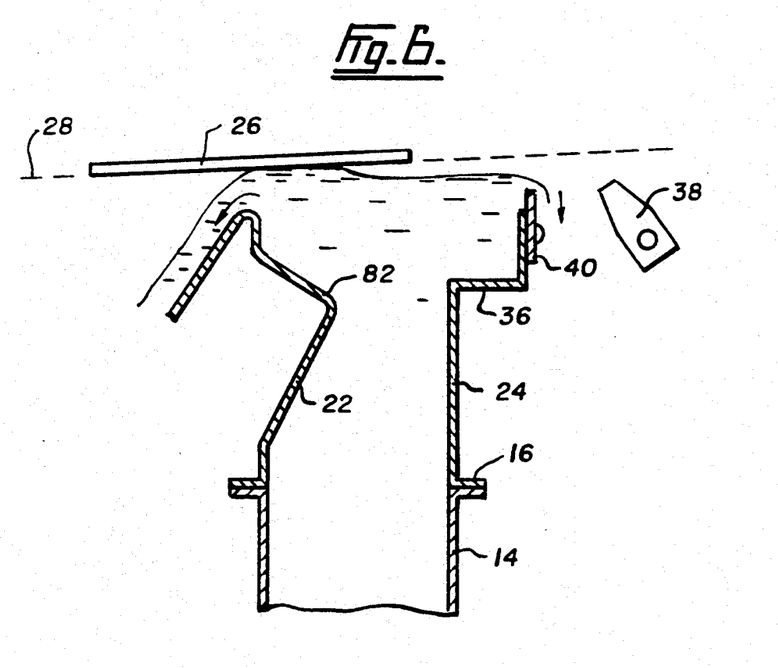

Another configuration of solder wave nozzle 12 is shown in FIG. 5 wherein the front wall 22 has an indent portion 82 projecting inwards into the nozzle to reduce the area of the nozzle. The gas knife 38 has a front wall 40 which joins divertly to the exit wall 24. A different version of a solder nozzle 12 is shown in FIG. 6 wherein an indent portion 82 is provided in the front wall 22, a tray 36 joined to the exit wall 24 has an adjustable weir 40, and a gas knife or gas jet 38 is positioned away from the nozzle 12.

Whereas a gas knife jet has been illustrated throughout the disclosure, other types of gas jets can be used.

Figure 7:
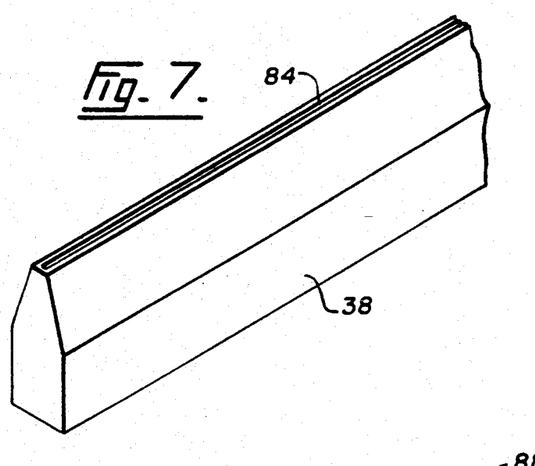
FIG. 7 is an isometric view showing one embodiment of a knife jet.

FIG. 7 illustrates a gas knife jet with a slot 84 extending for the length of the knife 38. A curtain of gas is projected from the slot. The gas may be pulsed or a steady stream and is generally only applied when an element is passing through the solder wave. The intensity of the gas curtain is determined to ensure the solder icicles and bridges are removed.

Figure 8:
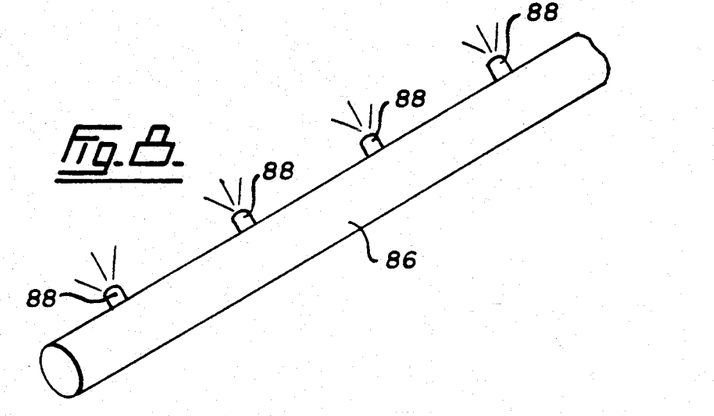
FIG. 8 is an isometric view showing plurality of individual jets nozzles in line from a gas manifold.
Figure 9:
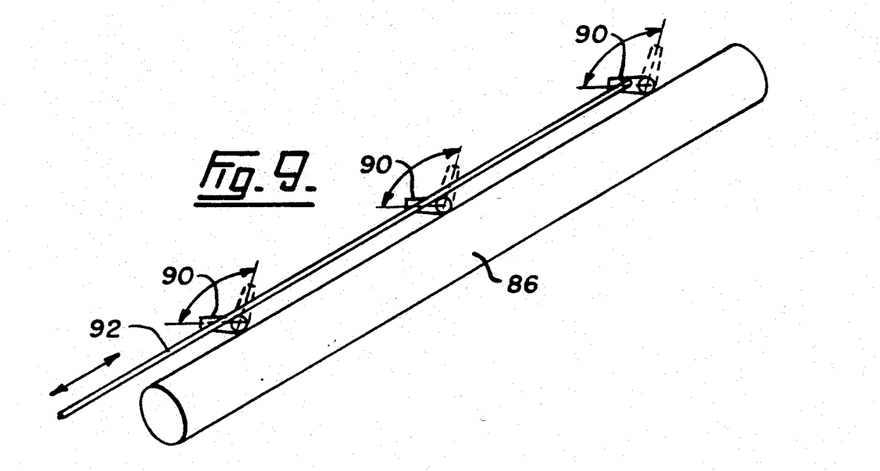
FIG. 9 is an isometric view showing three jet nozzles which reciprocate.

A gas manifold 86 is shown in FIG. 8 with a series of nozzles 88 in line spaced across the solder pot directed at the underside of the elements or circuit boards. Each nozzle may be a fan type nozzle to ensure coverage of the boards. Reciprocating nozzles 90 are illustrated in FIG. 9 with a connecting link 92 which reciprocates backwards and forwards so the nozzles project a jet of gas upwards on the underside of the elements. The reciprocation is synchronized with the movement of the elements to ensure the complete underside of the elements is covered by the jets.

In the embodiments shown, various changes to the profile of the solder wave may be made. By varying the height of the weir 40 either by changing the angle of the tray 36 or simply by providing a weir 40 which has an adjustable height, changes the solder flow on the exit side. Different types of solder wave nozzles may be provided, however in all cases a smooth turbulent free solder wave is formed above the nozzle rather than a ballistic type of projecting wave such as that shown by Tardoskegyi in U.S. Pat. No. 3,705,457. Gas jets may be retro fitted to existing types of solder wave machines that have smooth turbulent free solder waves.

Various changes may be made to the embodiment shown herein without departing from the scope of the present invention which is limited only by the following claims.

The embodiments of the present invention in which an exclusive property or privilege is claimed are defined as follows:

1. A method of wave soldering an element comprising the steps of:
   forming an upward flowing solder wave between two walls of a nozzle, the walls spaced a sufficient distance apart to provide a smooth turbulent free solder wave therefrom, the nozzle extending above a solder reservoir;
   moving the element in a predetermined path through the solder wave so that the solder wave contacts an undersurface of the element, and
   projecting at least one knife jet of non-oxidizing gas to impinge on the undersurface of the element after it exits from the solder wave at a sufficient flow rate to remove solder bridges and acicles from the undersurface of the element, and cover at least a portion of the solder wave with the non-oxidizing gas, at least a portion of the solder wave flowing into the knife jet and exiting below the surface of the solder in the solder reservoir.

2. The method of wave soldering an element according to claim 1 wherein a passage is provided on the exit side of the nozzle between the nozzle and the knife jet and at least a portion of the solder flows from the exit side of the nozzle and through the passage to return solder to the reservoir.

3. An apparatus for soldering an element comprising:
   a solder wave nozzle having an inlet wall and an exit wall, the walls spaced apart a sufficient distance to provide a smooth turbulent free solder wave from the nozzle;
   a tray attached to the exit wall of the nozzle, the tray having a weir at a downstream end;
   pump means to pump solder from a solder reservoir upwards through the nozzle to form the solder wave;
   conveyor means to convey the element in a predetermined path so the solder wave contacts an undersurface of the element;
   at least one gas knife jet integral with the weir positioned to impinge non-oxidizing gas on the undersurface of the element after the element exits from the solder wave, the gas knife jet having a variable angle of direction, and
   non-oxidizing gas supply means for supplying gas to the jet at a sufficient flow rate to remove solder bridges and icicles from the undersurface of the element and cover at least a portion of the solder wave.

4. An apparatus for soldering an element comprising:

a solder wave nozzle having an inlet wall and an exit wall, the walls spaced apart a sufficient distance to provide a smooth turbulent free solder wave from the nozzle, the nozzle extending above a solder reservoir, and permitting a greater volumetric portion of the solder wave to flow downwards from the inlet wall which has a contoured downward sloping guide attached thereto so the solder returns to the solder reservoir in a smooth flow;

the exit wall of the nozzle having a substantially rectangular tray attached thereto with an adjustable weir positioned at the edge of the tray, the shape of the tray together with the weir adapted to reduce feedback flow disturbances on the solder wave, and guide the remaining volumetric portion of the solder wave in a smooth horizontal downward sloping stream in substantially the same direction and at approximately the same speed as the element moving in a predetermined path;

pump means to pump solder from the solder reservoir upwards through the nozzle to form the solder wave;

conveyor means to convey the element in the predetermined path so the solder wave contacts an undersurface of the element;

at least one gas jet positioned to impinge non-oxidizing gas on the undersurface of the element after the element exits from the solder wave, and non-oxidizing gas supply means for supplying gas to the jet at a sufficient flow rate to remove solder bridges and icicles from the undersurface of the element and cover at least a portion of the solder wave.

5. An apparatus for soldering an element comprising:

a solder wave nozzle having an inlet wall and an exit wall, the walls spaced apart a sufficient distance to provide a smooth turbulent free solder wave therefrom, the nozzle extending above a solder reservoir;

the exit wall of the nozzle having a substantially rectangular tray attached thereto with an adjustable weir positioned at a downstream edge of the tray;

pump means to pump solder from the solder reservoir upwards through the nozzle to form the solder wave;

conveyor means to convey the element in a predetermined path so the solder wave contacts an undersurface of the element;

at least one gas knife jet positioned to impinge non-oxidizing gas on the undersurface of the element after the element exits from the solder wave, the gas knife jet integral with the weir and solder flowing over the weir flowing smoothly down through the gas knife jet and exiting at a port submerged in the solder of the reservoir, and non-oxidizing gas supply means for supplying gas to the jet at a sufficient flow rate to remove solder bridges and icicles from the undersurface of the element, and cover at least a portion of the solder wave.

6. A method of wave soldering an element comprising the steps of:

forming an upward flowing solder wave between two walls of a nozzle in a gas tight enclosure, the walls spaced a sufficient distance apart to provide a smooth turbulent free solder wave;

moving the element in a predetermined path through the solder wave, so that the solder wave contacts an undersurface of the element;

projecting at least one jet of non-oxidizing gas to impinge on the undersurface of the element after it exits from the solder wave at a sufficient flow rate to remove solder bridges and icicles from the undersurface of the element, and to cover at least a portion of the solder wave with the non-oxidizing gas, and maintaining non-oxidizing gas within the enclosure, with the non-oxidizing gas at least partially recirculated through the jet.

7. An apparatus for soldering an element comprising:

a solder wave nozzle having an inlet wall and an exit wall, the walls spaced apart a sufficient distance to provide a smooth turbulent free solder wave from the nozzle;

a gas tight enclosure enclosing the solder wave;

pump means to pump solder from a solder reservoir upwards through the nozzle to form the solder wave;

conveyor means to convey the element in a predetermined path, so the solder wave contacts an undersurface of the element;

at least one gas jet positioned to impinge non-oxidizing gas on the undersurface of the element after the element exits from the solder wave, and non-oxidizing gas supply means for supplying gas and maintaining gas within the enclosure, and at least partially recirculating the gas through the jet at a sufficient flow rate to remove solder bridges and icicles from the undersurface of the element, and cover at least a portion of the solder wave.

* * * * *